United States Patent [19]

Kyogoku et al.

[11] Patent Number: 5,140,464
[45] Date of Patent: Aug. 18, 1992

[54] INTERFERENCE FILM FILTER FOR COPYING MACHINE

[75] Inventors: Tetsuo Kyogoku, Osazaki; Katsuhiko Takeda, Toyokawa, both of Japan

[73] Assignee: Minolta Camera Kabushiki Kaisha, Osaka, Japan

[21] Appl. No.: 421,514

[22] Filed: Oct. 13, 1989

[30] Foreign Application Priority Data

Oct. 15, 1988 [JP] Japan .................. 63-260320

[51] Int. Cl.$^5$ .................. G02B 5/28; G03B 27/72
[52] U.S. Cl. .................. 359/588; 359/589; 359/587; 355/71
[58] Field of Search .............. 350/166, 164, 163, 165, 350/317; 355/71; 359/577, 580, 587, 588, 589, 590

[56] References Cited

U.S. PATENT DOCUMENTS

| 1,878,857 | 9/1932 | Kitroser .................. 350/317 |
| 2,742,819 | 4/1956 | Koch et al. .................. 350/166 |
| 3,410,626 | 11/1968 | Magrath .................. 350/166 |
| 3,892,490 | 7/1975 | Uetsuki et al. .................. 356/161 |

FOREIGN PATENT DOCUMENTS 235826 10/1986 Japan .
61224 3/1988 Japan .

OTHER PUBLICATIONS

Jenkins, Francis A., and White, Harvey E., *Fundamentals of Optics*, N.Y., McGraw-Hill, 1957, pp. 6–7.

Primary Examiner—Bruce Y. Arnold
Assistant Examiner—David R. Parsons
Attorney, Agent, or Firm—Price, Gess & Ubell

[57] ABSTRACT

An interference film filter for use in a copying machine as mounted on an optical path of light traveling through an image-forming lens for preventing transmission of the light in a predetermined wavelength range. The filter comprises a transparent glass substrate, and interference films each consisting of a plurality of layers formed by vapor deposition on the substrate. The interference films include a film disposed centrally of the substrate, and an opposed pair or pairs side films. Each of the side films has a greater optical film thickness than the center film or a film disposed immediately inwardly.

20 Claims, 11 Drawing Sheets

PROJECTING RANGE

INTERFERENCE FILM FILTER FOR COPYING MACHINE

BACKGROUND OF THE INVENTION

1. Field of the Invention

The present invention relates to an interference film filter for a copying machine.

2. Description of the Prior Art

An interference film filter is known in the art, which includes a multi-layer film of a metal or non-metal formed by vapor deposition for preventing transmission of light in a selected wavelength range. This interference film filter has excellent cutting characteristics, and is therefore used as an orthochromatic filter for a copying machine. The filter is formed by alternately depositing materials having different refractive indices on a glass substrate surface or an image-forming lens surface.

In recent years the copying machine has become increasingly small and compact, and its optical system often employs an image-forming lens having a wide field angle to achieve compactness. Where an image-forming lens having a wide field angle is used, however, the incident angle of light impinging upon the interference film filter varies over a wide range. As shown in FIG. 11, for example, an image-forming lens L3 has a maximum field angle of 26.6 degrees where a document plane to be exposed has a maximum length of 300 mm (with a maximum document size being A3) and the image-forming lens L3 has a focal length of 150 mm. With an interference film filter mounted in an aperture or a barrel of this image-forming lens L3, on-axis light (i.e. a light beam that forms an image at the central point on a photoreceptor plane) and off-axis light (i.e. light beams that form images at marginal points on the photoreceptor plane) have spectral characteristics as shown in FIG. 12. As seen, the spectral characteristics of the off-axis light beams are such that light having wavelengths about 620 to 750 nm has reduced transmission factors, and therefore light having a wavelength with a transmission factor at 50%, for example, shifts about 30 nm to the shorter wavelength side, thereby forming a deviation from the spectral characteristics of the on-axis light. In this case, a copy image developed with black toner has a density difference up to 0.1 (as measured with a Macbeth densitometer) between its center corresponding to the on-axis light beam and the marginal ends corresponding to the off-axis light beams. A color copy image developed with a plurality of color toners has a color difference of 10 or more (as measured with a color difference meter Delta-E*ab) between the center and the marginal ends. Thus, non-uniformity occurs in the density and color.

SUMMARY OF THE INVENTION

An object of the present invention is to provide an interference film filter for a copying machine, which minimizes the non-uniformity in the density and color by correcting angular characteristics of the interference film resulting from incident angle variations.

The above object is fulfilled, according to the present invention, by an interference film filter for use in a copying machine for preventing transmission of the light in a predetermined wavelength range, comprising at least one first interference film formed centrally of a substrate allowing transmission of on-axis light, and at least one second interference film formed on the substrate outwardly of the first interference film, the second interference film having a different optical film thickness to the first interference film.

With the known interference film filter, the transmission factor of light through the interference film becomes lower the greater its incident angle is. Consequently, light beams have greater spectral characteristics deviation the farther away the beams are from on-axis light. As distinct from the known filter, the filter for a copying machine according to the present invention employs two or more types of interference films having different optical film thicknesses. This construction is effective for correcting the angular characteristics of the interference film resulting from different incident angles, thereby preventing non-uniformity in the density and color appearing on copy images.

In a preferred form of the invention, the second interference film has a greater optical film thickness than the first interference film. This construction is capable of correcting the spectral characteristics of off-axis light traveling through the second interference film to agree with those of on-axis light. Further, since light beams between the on-axis light and off-axis light are the more likely to travel through the interference film of greater optical thickness the larger the incident angle is, their spectral characteristics are caused to approach those of the on-axis light for uniformity.

The foregoing and other objects, features and advantages of the invention will be apparent from the following more particular description of preferred embodiments of the invention, as illustrated in the accompanying drawings.

DESCRIPTION OF THE PREFERRED EMBODIMENTS

Embodiments of the present invention will be described hereinafter with reference to the accompanying drawings.

First Embodiment

Figure 1:
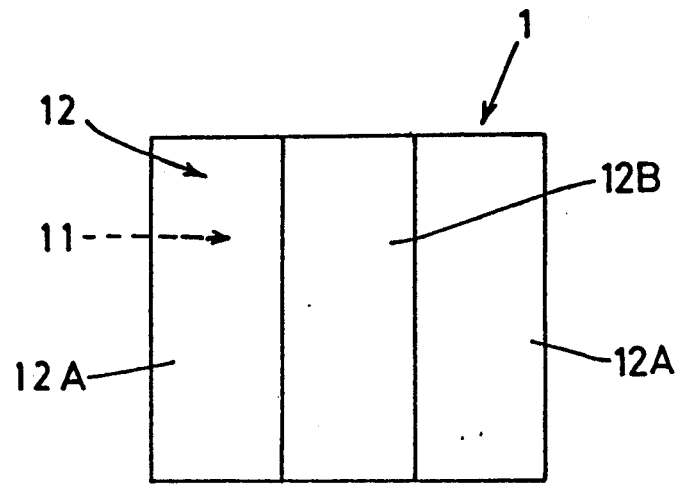
FIG. 1 is a plan view of an interference film filter according to a first embodiment of the present invention.
Figure 2:
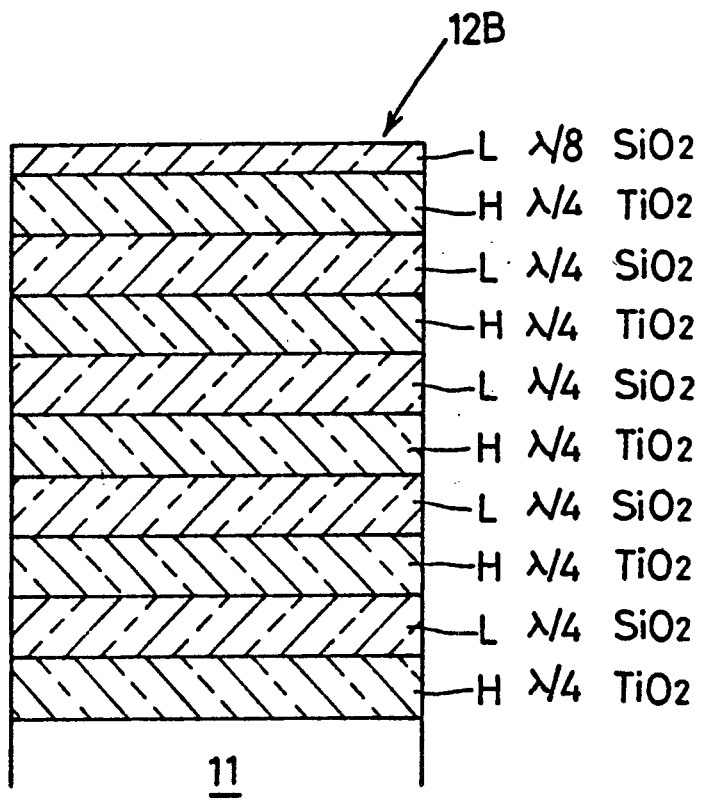
FIG. 2 is a sectional view of an interference film.

FIG. 1 is a plan view of an interference film filter 1 according to the present invention. This interference film filter 1 is a cyan filter for partially cutting red light. The filter 1 is in a plate form 80 mm long and 96 mm wide, and comprises a transparent glass substrate 11 and an interference film 12 formed by vacuum vapor deposition on a surface of the glass substrate 11. As shown in FIG. 1, the interference film 12 is transversely divided into three equal parts, i.e. a center portion 12B having a small optical film thickness, and opposite end portions 12A formed at opposite sides of the center portion 12B and having a large optical film thickness. As shown in FIG. 2, the center portion 12B has a 10-layer structure formed by alternately depositing on the transparent glass substrate 11 titanium dioxide (TiO$_2$) having a high refractive index (H:nL=2.30) and silicon dioxide (SiO$_2$) having a low refractive index (L:nL=1.46). The center portion 12B includes a first layer having an optical film thickness (nd) of 0.0930 micrometers and second to tenth layers respectively having an optical thickness of 0.1875 micrometers, so that its reference transmission wavelength (a wavelength at which the transmission factor is 50%) be 630 nm=0.63 micrometers. The end portions 12A have a greater transmission wavelength than the center portion 12B by 30 nm. More particularly, each end portion 12A has a 10-layer structure including a first layer having an optical film thickness of 0.0975 micrometers and second to tenth layers having an optical thickness of 0.195 micrometers, so that its reference transmission wavelength be 630+30 =660 nm=0.66 micrometers.

Figure 3:
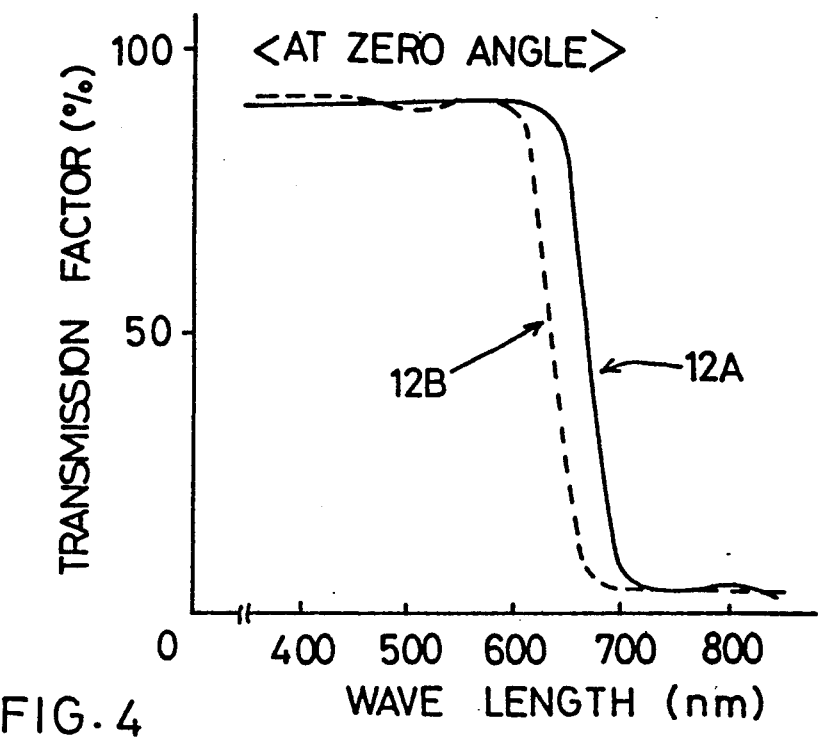
FIG. 3 is a graph showing spectral characteristics of light beams impinging on a central position and end positions of the interference film at zero angle thereto.
Figure 4:
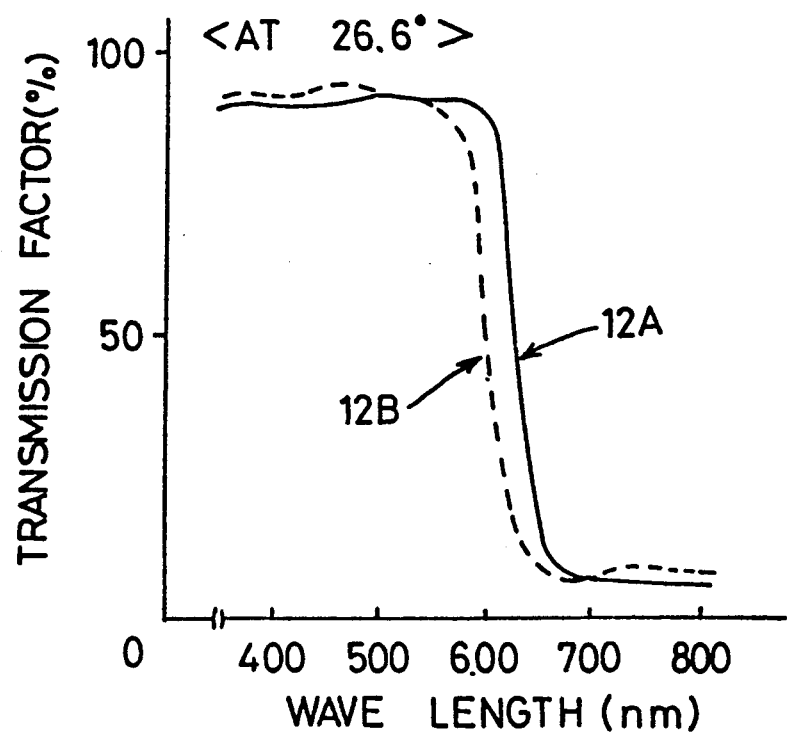
FIG. 4 is a graph showing spectral characteristics of light beams impinging on the central position and end positions of the interference film at 26.6 degrees thereto.

Spectral characteristics have been measured of transmission light beams impinging on the center portion 12B and opposite end portions 12A at zero angle and at an angle of 26.6 degrees thereto. FIG. 3 shows results of measurement taken of the light beams having zero incident angle, while FIG. 4 shows results of measurement taken of the light beams having the 26.6-degree incident angle. It will be seen that the spectral characteristics resulting from the light beam impinging on the center portion 12B at zero angle thereto approximately agree with those resulting from the light beams impinging on the end portions 12A at 26.6 degrees thereto.

Figure 5:
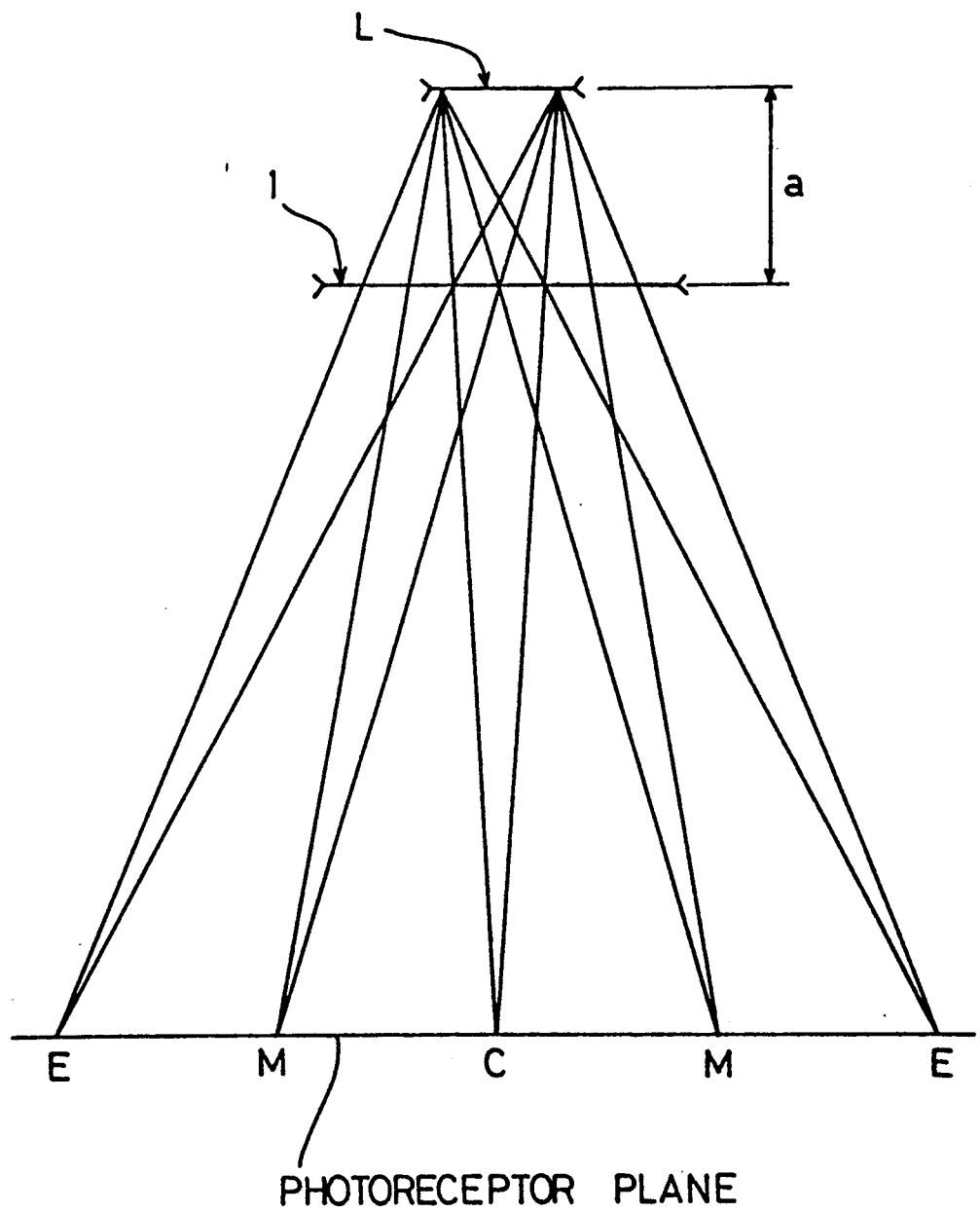
FIG. 5 is a view illustrating a position of the interference film filter.

FIG. 5 is a view illustrating the interference film filter 1 of the invention as mounted in an optical system of a slit exposure type copying machine. This optical system includes an image-forming lens L with a speed F of 8.0 and a focal length f of 150 mm. The interference film filter 1 is disposed at a distance a of about 62 mm from a diaphragm position of the image-forming lens L. This distance is geometrically determined with respect to a meeting position of an outermost beam of on-axis light and an innermost beam of off axis light. The position of the interference film filter 1 may be selected as desired, without being limited to the illustrated position a. In that case, however, modification must be made to the size divisions of the interference film 1.

Figure 6:
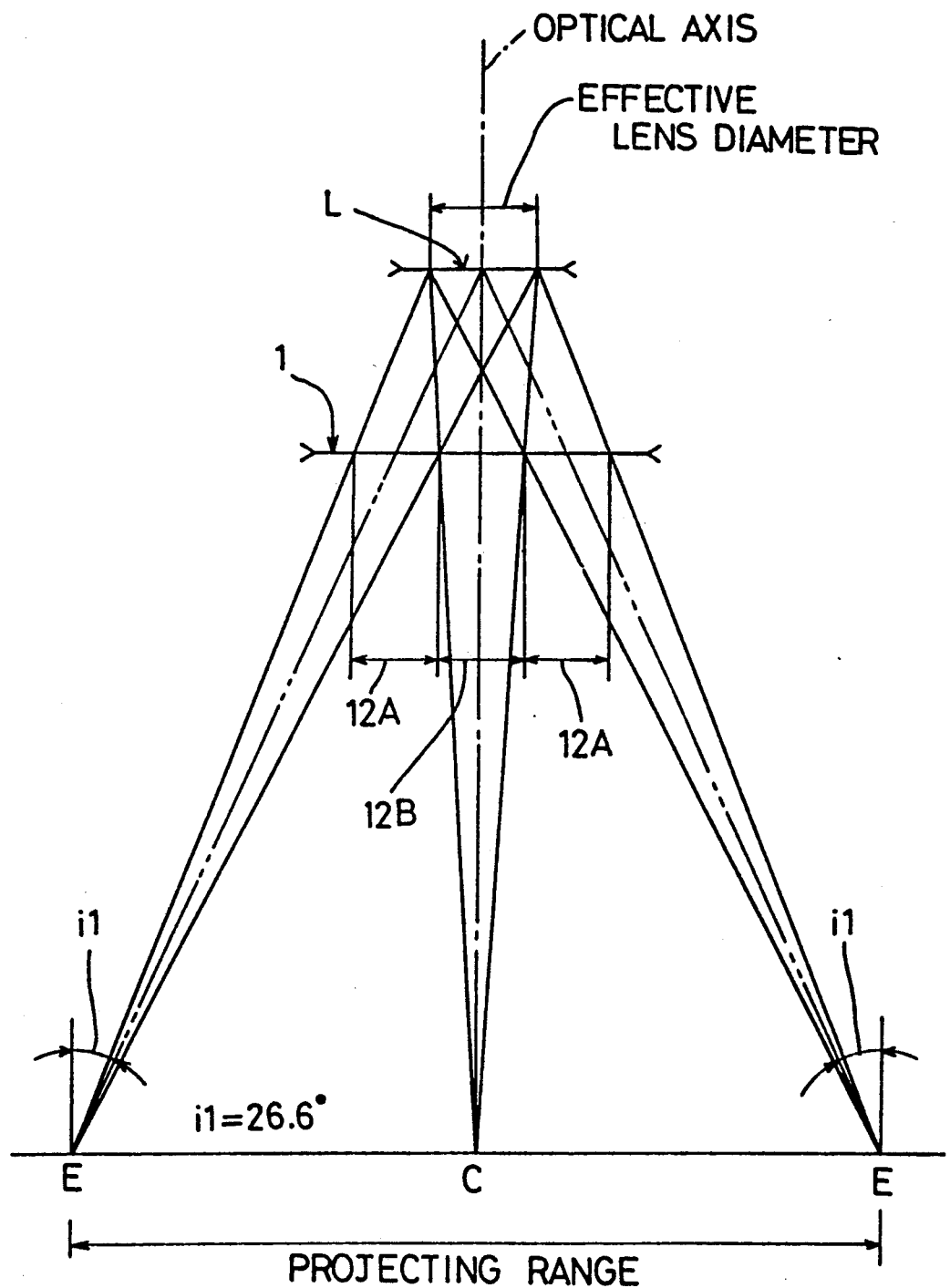
FIG. 6 is a view illustrating paths of an on-axis light beam and off-axis light beams.
Figure 7A:
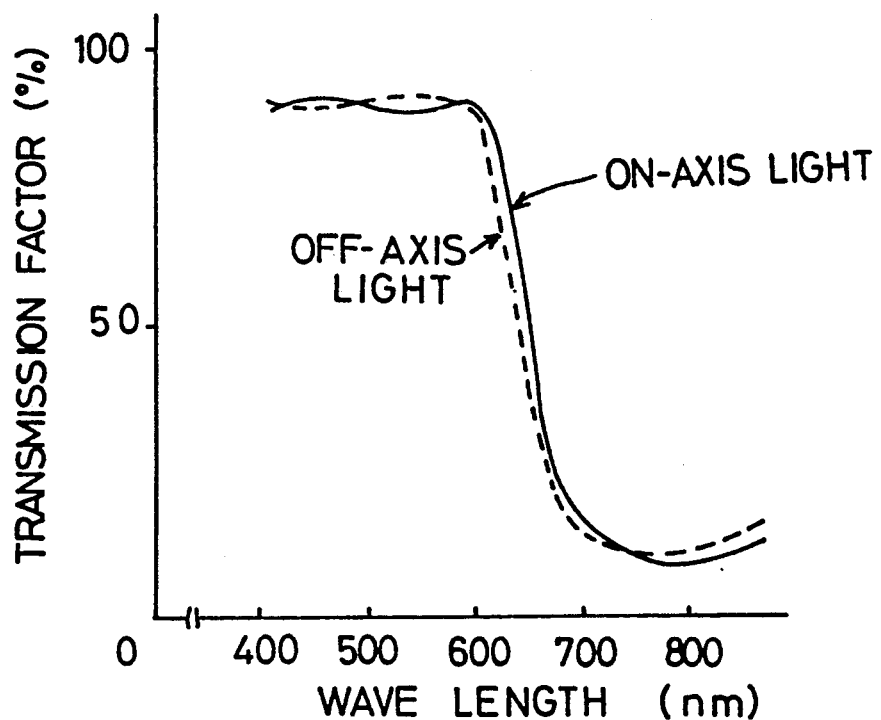
FIGS. 7A and 7B are graphs showing spectral characteristics of the interference film filter.

With the optical system as constructed above, as shown in FIG. 6, on-axis light emerging from the pupil of the image-forming lens L travels through on the center portion 12B of interference film filter 1 at about zero incident angle thereto, and forms an image at a central point C of a projecting range on a photoreceptor plane. On the other hand, off-axis light beams travel through the opposite end portions 12A of filter 1 at about 26-degree incident angle thereto, and form images at end points E of the projecting range on the photoreceptor plane. Since the off-axis light beams travel through the end portions 12A at about 26-degree incident angle i1, the off-axis light beams have spectral characteristics shifted to the shorter wavelength side to approximately agree with the spectral characteristics of the on-axis light beam, as shown in FIG. 7A.

Figure 7B:
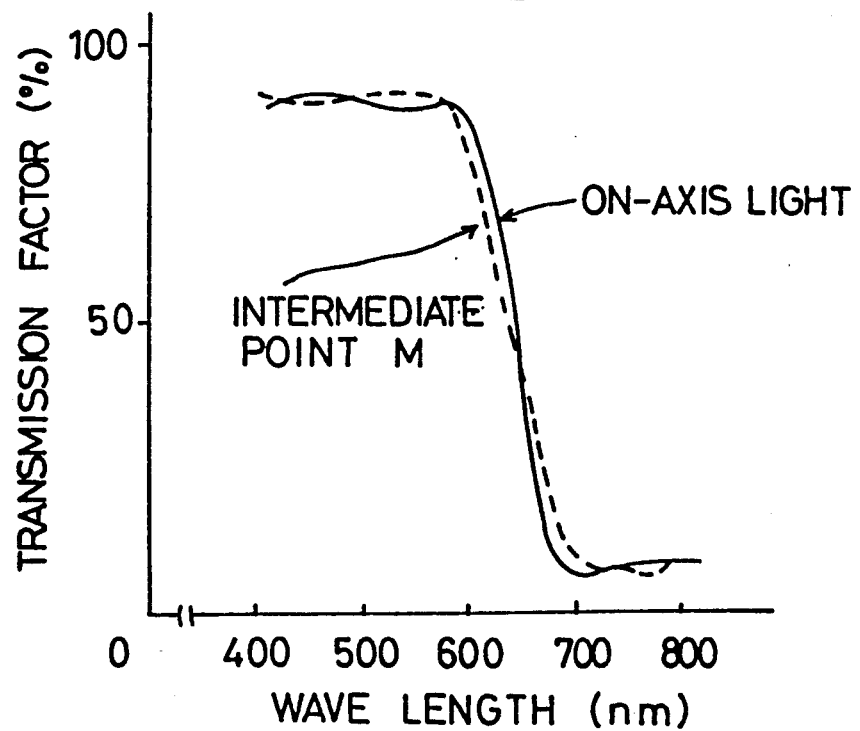
Figure 8:
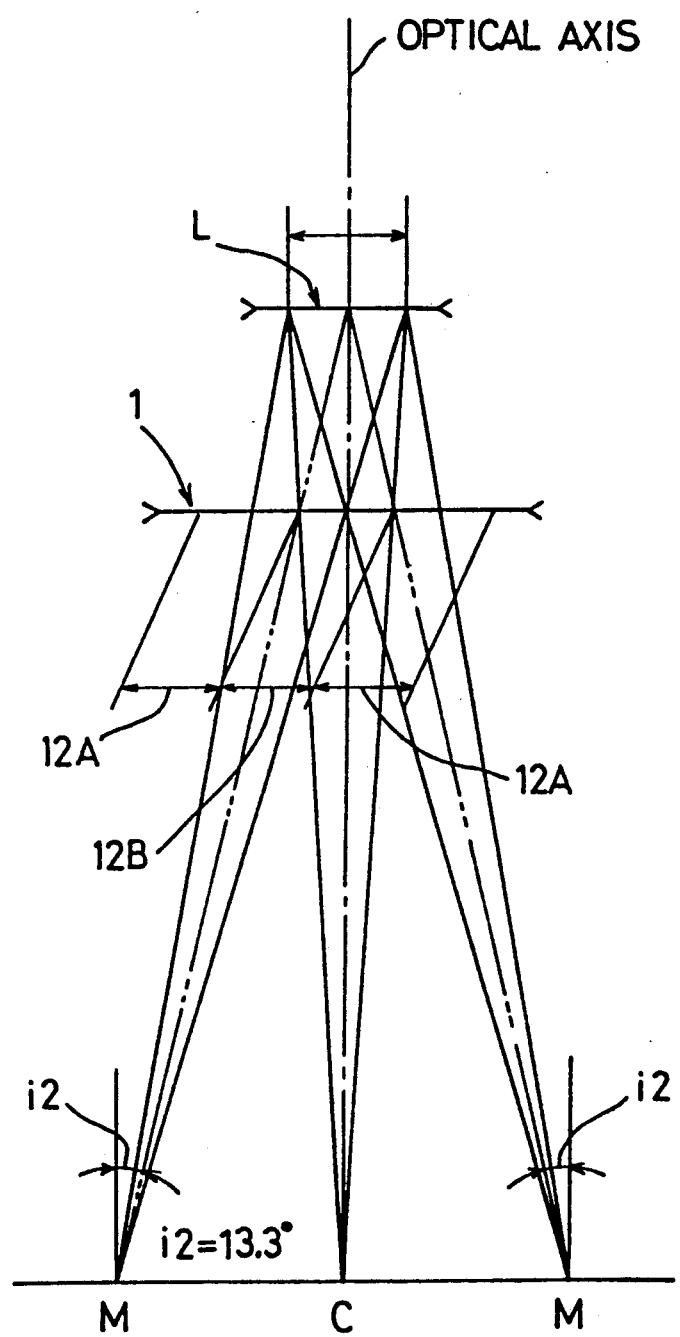
FIG. 8 is a view illustrating paths of light beams forming images at intermediate points.

As shown in FIG. 8, light beams forming images at intermediate points M between the central point C and end points E travel through the center portion 12B and end portions 12A of the interference film filter 1 at about 13-degree incident angle i$_2$. At this time, the center portion 12B and end portions 12A have an equal transmission area. That is, the center portion 12B has 50% of the total transmission area, with the end portions 12A sharing the remaining 50%. Since the light beam traveling through the center portion 12B has an incident angle of about 13 degrees in this case, its spectral characteristics are shifted about 15 nm to the shorter wavelength side, compared with the spectral characteristics of the light beam having zero incident angle (see FIG. 3). On the other hand, the light beams traveling through the opposite end portions 12A have their spectral characteristics shifted about 15 nm to the longer wavelength side, compared with the light beams having the 26-degree incident angle (see FIG. 4). Consequently, the shifts offset each other in the spectral characteristics of the combined light beams having traveled through the center portion 12B and end portions 12A having an equal area, whereby the spectral characteristics approach those of the light beam having zero incident angle to the center portion 12B and of the light beams having the 26-degree incident angle to the end portions 12A. Thus, as shown in FIG. 7B, the spectral characteristics for the intermediate points M are corrected to approximately agree with those of the on-axis light beam as in the case of end points E.

The spectral characteristics of light beams forming images at any positions between the central point C and end points E are also uniformalized to approximately agree with those of the on-axis light beam, since the area of transmission through either end portion 12A increases with the incident angle.

As described above, the filter 1 of this embodiment comprises the interference film 2 including the opposite end portions 12A of greater optical film thickness than the center portion 12B, and therefore is capable of effecting uniformalizing correction to the spectral characteristics deviations resulting from varied incident angles of transmission light. The stepwise variations in the film thickness facilitate manufacture of the interference film.

Second Embodiment

Figure 9:
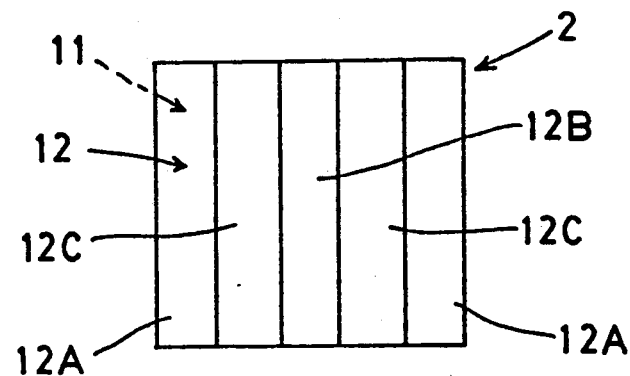
FIG. 9 is a plan view of an interference film filter according to a second embodiment of the invention.
Figure 10:
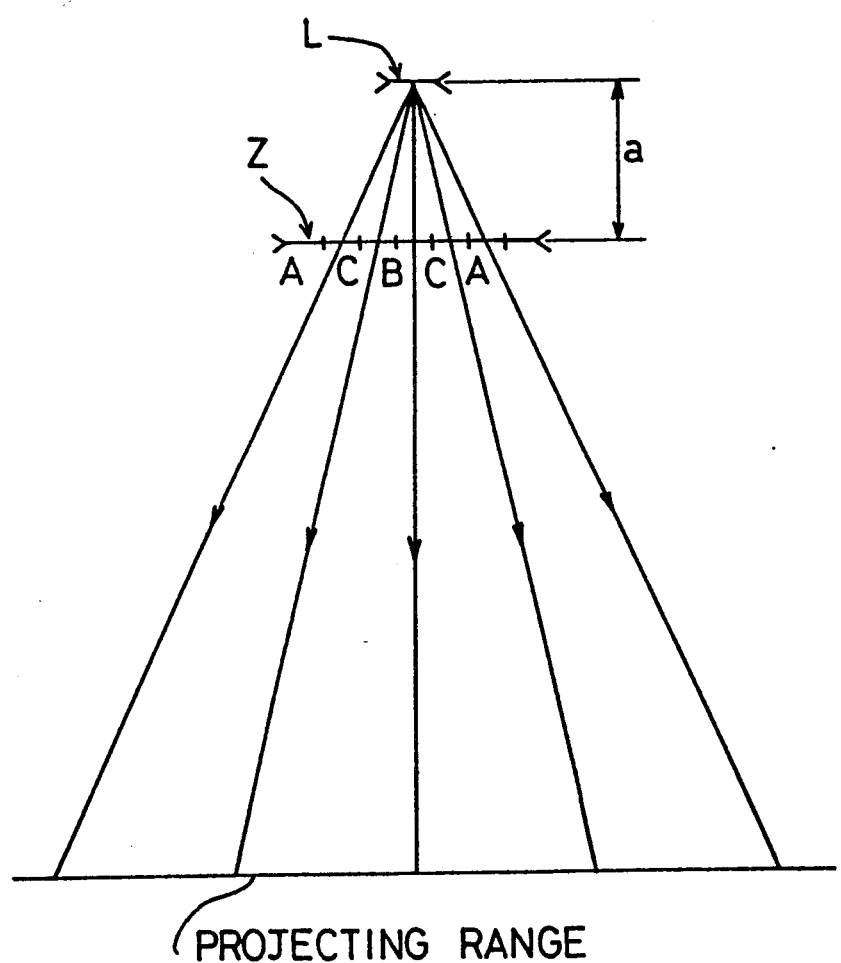
FIG. 10 is a view illustrating a position of the filter shown in FIG. 9.
Figure 11:
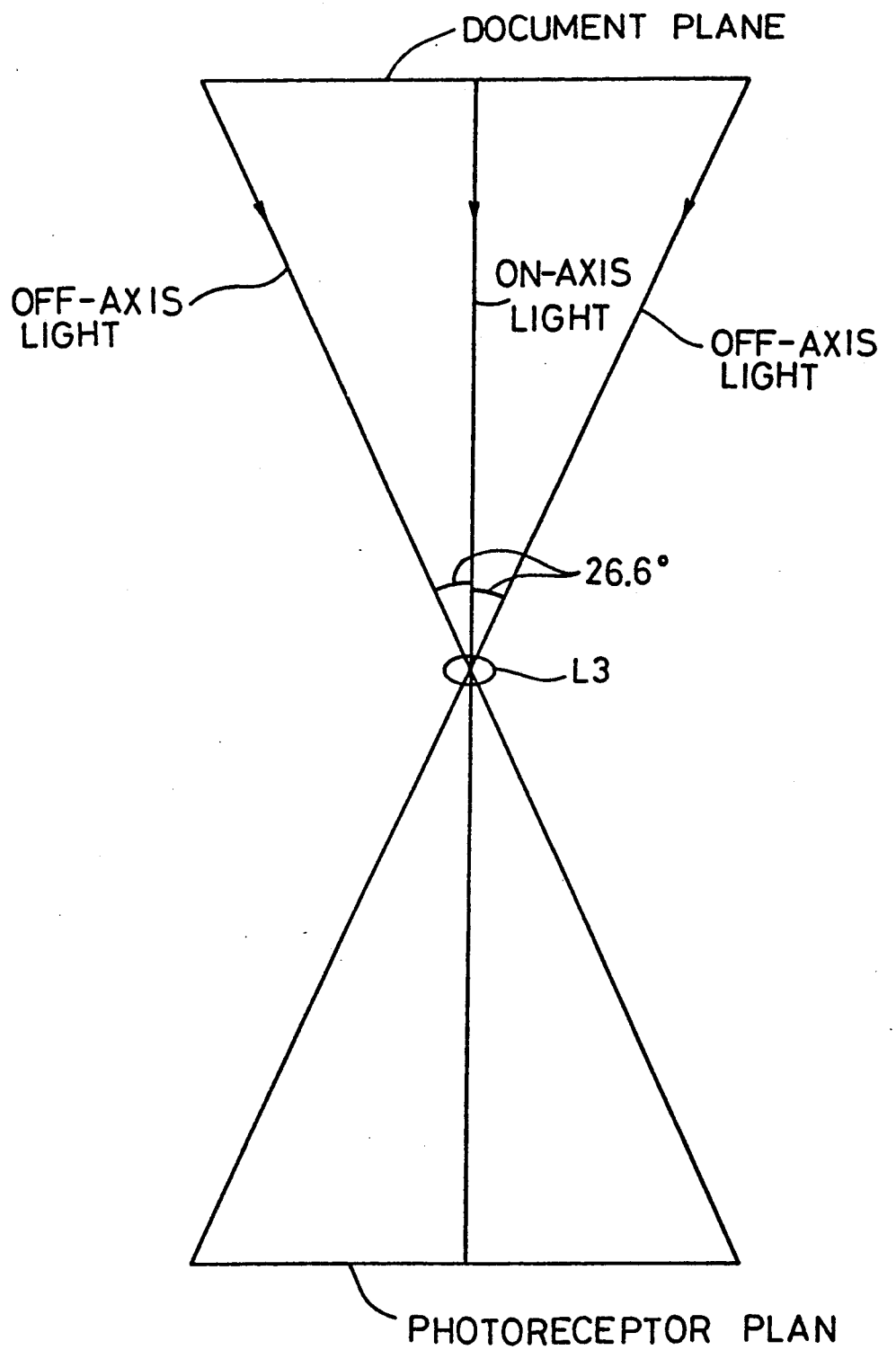
FIG. 11 is a view illustrating paths of light beams through a known interference film filter as used in a copying machine.
Figure 12:
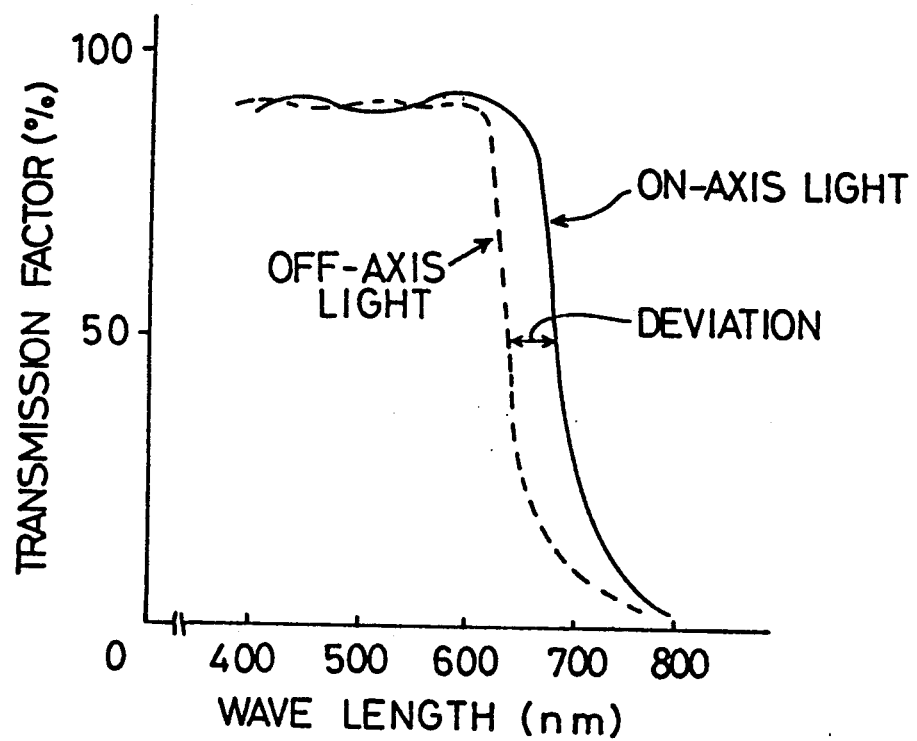
FIG. 12 is a graph showing angular characteristics of the known filter.
Figure 13:
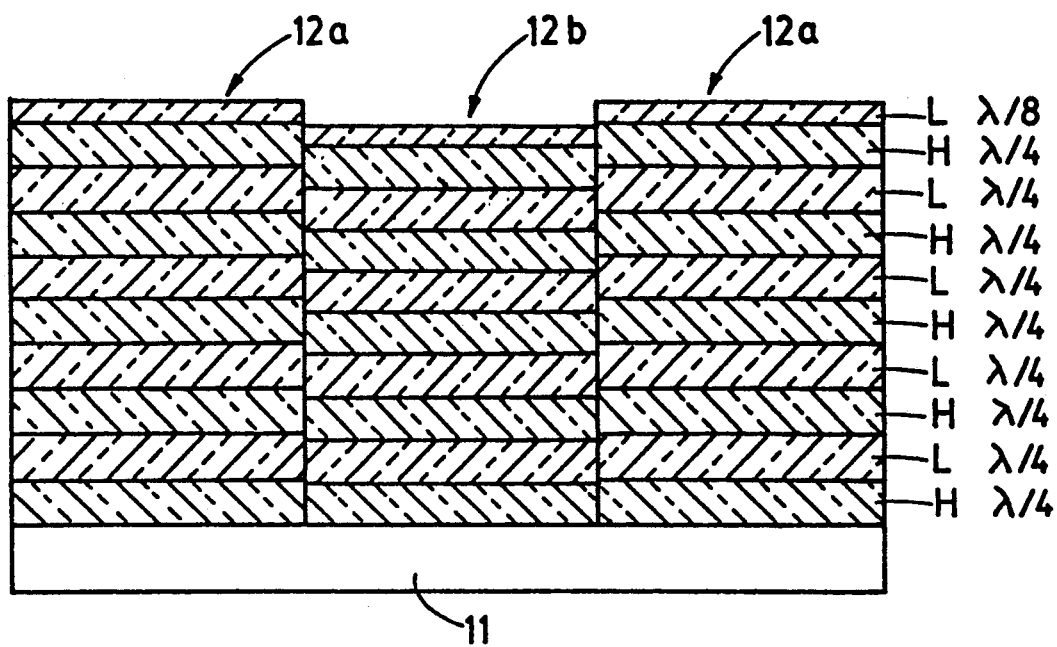
FIG. 13 is a sectional view of the embodiment shown in FIG. 1.
Figure 14:
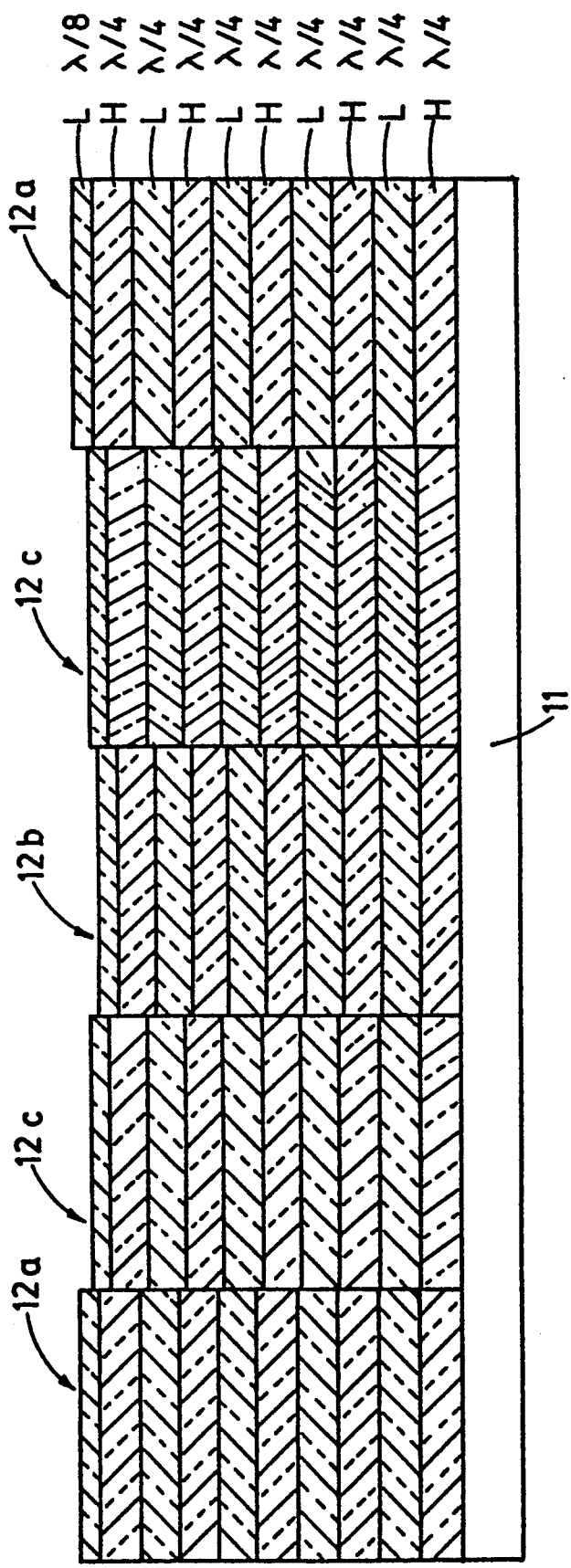
FIG. 14 is a sectional view of the embodiment shown in FIG. 9.

FIG. 9 is a plan view of an interference film filter 2 according to the present invention. This interference film filter 2 is constructed for a more precise correction than the first embodiment, and comprises a transparent glass substrate 11 and an interference film formed on the glass substrate 11 and having three different optical film thicknesses. As shown in FIG. 9, the interference film 12 is transversely divided into five equal parts, i.e. a center portion 12B, end portions 12A formed at opposite sides, and intermediate portions 12C formed in between. The center portion 12B and end portions 12A have the same optical film thicknesses as the center portion 12B and end portions 12A of the first embodiment, respectively. Each intermediate portion 12C includes a first layer having an optical film thickness of 0.0956 micrometers and second to tenth layers having an optical thickness of 0.191 micrometers, so that its reference transmission wavelength $\lambda_3$ be 645 nm=0.645 micrometers. As a result, the optical film thickness increases stepwise from the center portion 12B to the opposite end portions 12A. For mounting this interference film filter 2 in the same optical system as in the first embodiment, the filter 2 is disposed at a distance a of 105 mm from the image-forming lens L as shown in FIG. 10. The filter 2 may be disposed at a different position, but it is necessary to make the filter 2 larger, the closer it is to the photoreceptor plane.

Since interference film filter 2 of this embodiment comprises three types of interference films with the optical film thickness varying stepwise, the spectral characteristics may be uniformalized for the light beams ranging from on-axis light to off-axis light. Thus the filter of this embodiment is capable of a more precise correction than the filter of the first embodiment.

The filter may be made applicable to a total exposure type copying machine by forming the interference film to diverge radially about the optical axis and varying its optical film thickness in the stepped manner.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An interference film filter for use in a copying machine as mounted on an optical axis of light traveling through an image-forming lens for preventing transmission of the light in a predetermined wavelength range, said filter comprising:
    at least one first interference film formed on a central part of a surface of a substrate positioned to coincide with the optical axis and allowing transmission of on-axis light; and
    at least one second interference film formed on the surface of said substrate adjacent to said first interference film, said second interference film having a different optical film thickness than said first interference film.

2. An interference film filter as claimed in claim 1, wherein said second interference film has a greater optical film thickness than said first interference film.

3. An interference film filter as claimed in claim 2, wherein said first and second interference films are formed of a plurality of layers and have the same number of layers, of which the layers in odd numbers counted from said substrate have a high refractive index and the layers in even numbers have a low refractive index, the final layer counted from said substrate being a low refractive index layer.

4. An interference film filter as claimed in claim 1, wherein said first interference film includes a plurality of layers, of which the layers in odd numbers counted from said substrate have a high refractive index and the layers in even numbers have a low refractive index.

5. An interference film filter as claimed in claim 4, wherein the final layer of said first interference film counted from said substrate is a low refractive index layer having an optical film thickness of $\lambda/8$, the other layers respectively having an optical film thickness of $\lambda/4$.

6. An interference film filter comprising:
    a transparent glass substrate;
    a first film including a plurality of layers superposed on a surface of said substrate by vapor deposition at a central portion of said substrate; and
    second films each including a plurality of layers superposed on the surface of said substrate by vapor deposition at opposite sides of said first film, each of said second films having a greater optical film thickness than said first film.

7. An interference film filter as claimed in claim 6, wherein each of said first and second films is formed by alternately vapor-depositing titanium dioxide having a high refractive index and silicon dioxide having a low refractive index.

8. An interference film filter as claimed in claim 7, wherein each of said first and second films has a 10-layer structure.

9. An interference film filter as claimed in claim 8, wherein said first film includes a first layer adjacent an air interface having an optical film thickness of 0.0930 micrometers, and second to tenth layers each having an optical film thickness of 0.1875 micrometers, and each of said second films includes a first layer having an optical film thickness of 0.0975 micrometers, and second to tenth layers each having an optical film thickness of 0.195 micrometers.

10. An interference film filter comprising:
    a transparent glass substrate;
    a first film including a plurality of layers superposed on a central portion of a surface of said substrate by vapor deposition;
    second films each including a plurality of layers superposed on the surface of said substrate by vapor deposition adjacent to and at opposite sides of said first film, each of said second films having a greater optical film thickness than said first film; and
    third films each including a plurality of layers superposed on the surface of said substrate by vapor deposition adjacent to one side of each second film which is opposite the side of each second film which is adjacent to the first film, each of said third films having a greater optical film thickness than each of said second films.

11. An interference film filter as claimed in claim 10, wherein each of said first, second and third films is formed by alternately vapor-depositing titanium dioxide having a high refractive index and silicon dioxide having a low refractive index, and wherein each of said first, second and third films has a 10-layer structure and a tenth layer of each film adjacent to said substrate is composed of titanium dioxide.

12. An interference film filter as claimed in claim 11, wherein said first film includes a first layer having an optical film thickness of 0.0930 micrometers, and second to tenth layers each having an optical film thickness of 0.1875 micrometers, each of said second films includes a first layer having an optical film thickness of 0.0956 micrometers, and second to tenth layers each having an optical film thickness of 0.191 micrometers, and each of said third films includes a first layer having an optical film thickness of 0.0975 micrometers, and second to tenth layers each having an optical film thickness of 0.195 micrometers.

13. In a copying machine optical system, the improvement of an interference filter member positioned between an object to be copied and a photoreceptor member for receiving light rays defining an image of the object both on an optical axis and at positions off the optical axis, across the field angle of the optical system, comprising:

a substrate transparent to image rays of the object;

a first central interference film means positioned on the substrate and coinciding with the optical axis, a design wavelength of the first central interference film means being selected to correspond to perpendicular incident image light rays on the substrate at the optical axis, and second interference film means positioned adjacent the first central interference film and offset from the optical axis, a design wavelength of the second interference film means being selected to correspond with the first design wavelength and the field angle of the optical system for varying spectral characteristics determinative of transmission of wavelengths of off-axis light rays traversing the second interference film at an angle to the optical axis to render those characteristics to be equivalent to spectral characteristics determinative of transmission of wavelengths of the on-axis light rays of the first central interference film whereby uniformity in density and color of the image can be achieved in copying.

14. The copying machine optical system of claim 13 further including a third interference film means positioned adjacent the second interference film means and offset further from the optical axis than the second interference film means, a design wavelength of the third interference film means being selected to correspond with the first design wavelength and the field angle of the optical system for varying spectral characteristics determinative of transmission of wavelengths of off-axis light rays traversing the third interference film means at an angle to the optical axis to render those characteristics to be equivalent to spectral characteristics of the on-axis light of the first central interference film means whereby uniformity in density and color of the image can be achieved in copying.

15. The copying machine optical system of claim 14 wherein the second interference film means are positioned on diametrically opposite sides of the first interference film means and the third interference film means is positioned on the furthest side of each of the second interference film means from the optical axis.

16. The copying machine optical system of claim 14 wherein the design wavelength of the first central interference film is approximately 630 nm.

17. The copying machine optical system of claim 14 wherein an optical film thickness of the third interference film means is larger than an optical film thickness of the second interference film means and the optical film thickness of the first central interference film means is smaller than the optical film thickness of the second interference film means.

18. The copying machine optical system of claim 14 wherein each of the first, second and third film means is formed by alternately vapor-depositing layers of titanium dioxide having a high refractive index and layers of silicon dioxide having a low refractive index on the substrate, and wherein each of the first, second and third interference film means has a 10-layer structure with a tenth layer of each film means adjacent the substrate composed of titanium dioxide.

19. The copying machine optical system of claim 18 wherein the first interference film includes a first layer having an optical film thickness of 0.0930 micrometers, and second to tenth layers each having an optical film thickness of 0.1875 micrometers, the second interference film includes a first layer having an optical film thickness of 0.0956 micrometers, and second to tenth layers each having an optical film thickness of 0.191 micrometers, and the third interference film includes a first layer having an optical film thickness of 0.0975 micrometers, and second to tenth layers each having an optical film thickness of 0.195 micrometers.

20. The copying machine optical system of claim 13 wherein an optical film thickness of the first central interference film means is smaller than an optical film thickness of the second interference film means.

* * * * *